US012691786B2

(12) United States Patent
Lee et al.

(10) Patent No.: US 12,691,786 B2
(45) Date of Patent: Jul. 28, 2026

(54) METHOD FOR DERATING BATTERY CHARGING POWER AND BATTERY PACK TO WHICH THE METHOD IS APPLIED

(71) Applicant: SAMSUNG SDI CO., LTD., Yongin-si (KR)

(72) Inventors: Jiwon Lee, Yongin-si (KR); Joon-Woo Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 31 days.

(21) Appl. No.: 18/766,454

(22) Filed: Jul. 8, 2024

(65) Prior Publication Data

US 2025/0242717 A1      Jul. 31, 2025

(30) Foreign Application Priority Data

Jan. 29, 2024    (KR) ........................ 10-2024-0013319

(51) Int. Cl.
| | |
|---|---|
| *B60L 58/15* | (2019.01) |
| *B60L 7/10* | (2006.01) |
| *H01M 10/42* | (2006.01) |
| *H01M 10/46* | (2006.01) |

(52) U.S. Cl.
CPC ................. *B60L 58/15* (2019.02); *B60L 7/10* (2013.01); *H01M 10/425* (2013.01); *H01M 10/46* (2013.01); *B60L 2240/12* (2013.01); *B60L 2240/545* (2013.01); *B60L 2240/62* (2013.01); *H01M 2010/4271* (2013.01); *H01M 2220/20* (2013.01)

(58) Field of Classification Search
CPC ..... B60L 58/15; H01M 10/425; H01M 10/46; H01M 2010/4271; H01M 2220/20

USPC .......................................................... 307/9.1
See application file for complete search history.

(56) References Cited

U.S. PATENT DOCUMENTS

| | | | |
|---|---|---|---|
| 2005/0189894 A1 | 9/2005 | Komiyama et al. | |
| 2008/0136375 A1 | 6/2008 | Nam et al. | |
| 2009/0160247 A1 | 6/2009 | Nakamura et al. | |
| 2016/0155278 A1 | 6/2016 | Nozawa et al. | |
| 2016/0243947 A1 | 8/2016 | Perkins et al. | |
| 2021/0239762 A1* | 8/2021 | Zhang ................ | G01R 31/3835 |

FOREIGN PATENT DOCUMENTS

| | | | | |
|---|---|---|---|---|
| EP | 2648936 B1 * | 6/2016 | ............. | B60K 6/485 |
| JP | 2001-169408 A | 6/2001 | | |
| JP | 2015-131559 A | 7/2015 | | |
| KR | 10-2016-0049899 A | 5/2016 | | |

OTHER PUBLICATIONS

EPO Extended European Search Report dated Mar. 24, 2025, issued in European Patent Application No. 24206589.4, 12 pages.

* cited by examiner

*Primary Examiner* — Rexford N Barnie
*Assistant Examiner* — Swarna N Chowdhuri
(74) *Attorney, Agent, or Firm* — Womble Bond Dickinson (US) LLP

(57) ABSTRACT

A method for derating a charge power of a battery, includes: obtaining altitude data of a vehicle; obtaining descent speed data of the vehicle; calculating, based on the altitude data and the descent speed data, a prediction value of an increase in a charging current of the battery equipped in the vehicle due to regenerative braking; and derating the charging power of the battery based on the calculated prediction value.

20 Claims, 10 Drawing Sheets

1000

METHOD FOR DERATING BATTERY CHARGING POWER AND BATTERY PACK TO WHICH THE METHOD IS APPLIED

CROSS-REFERENCE TO RELATED APPLICATION

The present application claims priority to and the benefit of Korean Application No. 10-2024-0013319, filed on Jan. 29, 2024, in the Korean Intellectual Property Office, the entire disclosure of which is incorporated by reference herein.

BACKGROUND

1. Field

Aspects of embodiments of the present disclosure relate to a method for derating a battery charging power, and a battery pack to which the method is applied.

2. Description of Related Art

Secondary batteries are rechargeable batteries that are designed to be discharged and recharged multiple times. Such secondary batteries are commonly used in various applications, such as electronic devices (e.g., smart phones, laptops, tablets, and the like), electric vehicles, solar power generation, and emergency power supplies. For example, lithium-ion batteries are widely used in various electronic products and electric vehicles due to their high energy density and high charge/discharge efficiency.

Electric vehicles may recharge their batteries through regenerative braking. Regenerative braking refers to a technology of charging the high-voltage battery during coasting (e.g., regenerative braking) after the accelerator pedal is released while driving by the motor that acts as a generator through the wheels. Regenerative braking may extend the battery charging cycle.

The above information disclosed in this Background section is for enhancement of understanding of the background of the present disclosure, and therefore, it may contain information that does not constitute related (or prior) art.

SUMMARY

Regenerative braking in comparative systems may face an issue of potential battery overcharging during prolonged driving from a high altitude to a low altitude in electric vehicles. To prevent such battery overcharging, a connection between the battery and the vehicle system may be severed, resulting in a situation where the battery stops charging and the electric vehicle does not receive power from the battery.

Embodiments of the present disclosure may be directed to a method for derating a battery charging power, a computer program, and a battery pack to which the method is applied. In more detail, embodiments of the present disclosure may be directed to a method for derating a charging power of a battery from regenerative braking when a vehicle equipped with the battery is traveling from a higher altitude to a lower altitude, and a battery pack to which the method is applied.

These and other aspects and features of the present disclosure will be described in or will be apparent from the following description of embodiments of the present disclosure.

According to one or more embodiments of the present disclosure, a method for derating a charge power of a battery, includes: obtaining altitude data of a vehicle; obtaining descent speed data of the vehicle; calculating, based on the altitude data and the descent speed data, a prediction value of an increase in a charging current of the battery equipped in the vehicle due to regenerative braking; and derating the charging power of the battery based on the calculated prediction value.

In an embodiment, the obtaining of the altitude data of the vehicle may include receiving the altitude data of the vehicle from a positioning system installed in the vehicle.

In an embodiment, the obtaining of the altitude data of the vehicle may include receiving the altitude data of the vehicle from an altitude sensor embedded in the battery.

In an embodiment, the prediction value of the increase in the charging current may be inversely proportional to a value of the descent speed data.

In an embodiment, the derating of the charging power of the battery based on the calculated prediction value may include: calculating a cumulative energy of a battery protection device connected to the battery using the calculated prediction value and a characteristic constant of the battery protection device; and derating the charging power of the battery based on the calculated cumulative energy of the battery protection device.

In an embodiment, the calculating of the cumulative energy of the battery protection device may include: calculating the cumulative energy of the battery protection device based on the calculated prediction value, a heating characteristic constant of the battery protection device, a cooling characteristic constant of the battery protection device, and a preceding cumulative energy, and the calculated cumulative energy may be a subsequent cumulative energy calculated after a time interval from a calculation of the preceding cumulative energy.

In an embodiment, the derating of the charging power of the battery based on the calculated cumulative energy of the battery protection device may include: derating the charging power of the battery by a proportion corresponding to a range relative to a protection limit energy of the battery protection device, if the calculated cumulative energy of the battery protection device falls within the range.

In an embodiment, the range relative to the protection limit energy of the battery protection device may include a plurality of different ranges of the protection limit energy of the battery protection device, and different proportions for derating the charging power of the battery may be respectively determined for the plurality of different ranges.

In an embodiment, the derating of the charging power of the battery by the proportion corresponding to the range may include, derating the charging power of the battery by 5%, if the calculated cumulative energy falls within a range of 60% or more but less than 70% of the protection limit energy of the battery protection device.

In an embodiment, the derating of the charging power of the battery by the proportion corresponding to the range may include, derating the charging power of the battery by 15%, if the calculated cumulative energy falls within a range of 70% or more but less than 80% of the protection limit energy of the battery protection device.

In an embodiment, the derating of the charging power of the battery by the proportion corresponding to the range may include, derating the charging power of the battery by 25%, if the calculated cumulative energy falls within a range of 80% or more but less than 90% of the protection limit energy of the battery protection device.

In an embodiment, the derating of the charging power of the battery by the proportion corresponding to the range may include, derating the charging power of the battery by 35%, if the calculated cumulative energy falls within a range of 90% or more but less than 95% of the protection limit energy of the battery protection device.

In an embodiment, the derating of the charging power of the battery by the proportion corresponding to the range may include, derating the charging power of the battery by 45%, if the calculated cumulative energy falls within a range of 95% or more of the protection limit energy of the battery protection device.

In an embodiment, the battery protection device may include a contactor.

In an embodiment, a non-transitory computer-readable recording medium may store instructions that, when executed by one or more processors, cause the one or more processors to perform the method.

According to one or more embodiments of the present disclosure, a battery pack includes: a battery assembly including a plurality of battery cells; a battery protection device connected to the battery assembly; and a battery management system including: a measurement unit configured to measure altitude data of a vehicle and descent speed data of the vehicle; a charge prediction unit configured to calculate a prediction value of an increase in a charging current of the battery assembly due to regenerative braking based on the altitude data and the descent speed data; and a derating unit configured to derate a charging power of the battery assembly based on the calculated prediction value of the increase in the charging current.

In an embodiment, the charge prediction unit may be configured to calculate a cumulative energy of the battery protection device based on the calculated prediction value of the increase in the charging current, a heating characteristic constant of the battery protection device, a cooling characteristic constant of the battery protection device, and a preceding cumulative energy, and the calculated cumulative energy may be a subsequent cumulative energy calculated after a time interval from a calculation of the preceding cumulative energy.

In an embodiment, the derating unit may be configured to derate the charging power of the battery assembly by a proportion corresponding to a range relative to a protection limit energy of the battery protection device, if the calculated cumulative energy falls within the range.

In an embodiment, the range relative to the protection limit energy of the battery protection device may include a plurality of different ranges of the protection limit energy of the battery protection device, and different proportions for derating the charging power of the battery assembly are respectively determined for the plurality of different ranges.

In an embodiment, the battery protection device may include a contactor.

According to some embodiments of the present disclosure, the charging power of the battery generated by regenerative braking during altitude descent driving of the vehicle including the battery may be effectively controlled, thereby preventing or substantially preventing battery overcharging, and promoting safe vehicle operation.

According to some embodiments of the present disclosure, the vehicle may be charged appropriately during altitude descent driving of the vehicle including the battery by predicting a value of the increase in charging current, and applying different proportions of derating the charging power of the vehicle depending on the prediction value of the increase in the charging current.

However, aspects and features of the present disclosure are not limited to those described above, and other aspects and features not mentioned will be clearly understood by a person skilled in the art from the detailed description, described below.

BRIEF DESCRIPTION OF THE DRAWINGS

The following drawings attached to this specification illustrate embodiments of the present disclosure, and further describe aspects and features of the present disclosure together with the detailed description of the present disclosure. Thus, the present disclosure should not be construed as being limited to the drawings.

DETAILED DESCRIPTION

Figure 1:
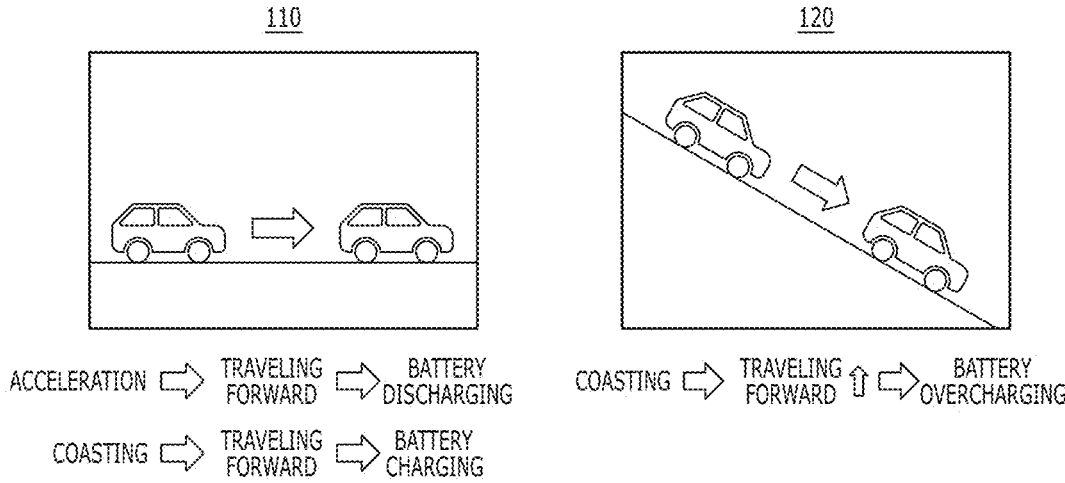
FIG. 1 is a diagram illustrating a process of charging and discharging a battery depending on a driving situation of a vehicle.

Hereinafter, embodiments of the present disclosure will be described, in detail, with reference to the accompanying drawings. The terms or words used in this specification and claims should not be construed as being limited to the usual or dictionary meaning and should be interpreted as meaning and concept consistent with the technical idea of the present disclosure based on the principle that the inventor can be his/her own lexicographer to appropriately define the concept of the term to explain his/her invention in the best way.

The embodiments described in this specification and the configurations shown in the drawings are only some of the embodiments of the present disclosure and do not represent all of the technical ideas, aspects, and features of the present disclosure. Accordingly, it should be understood that there may be various equivalents and modifications that can replace or modify the embodiments described herein at the time of filing this application.

It will be understood that when an element or layer is referred to as being "on," "connected to," or "coupled to"

another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. When phrases such as "at least one of A, B and C," "at least one of A, B or C," "at least one selected from a group of A, B and C," or "at least one selected from among A, B and C" are used to designate a list of elements A, B and C, the phrase may refer to any and all suitable combinations or a subset of A, B and C, such as A, B, C, A and B, A and C, B and C, or A and B and C. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

References to two compared elements, features, etc. as being "the same" may mean that they are "substantially the same". Thus, the phrase "substantially the same" may include a case having a deviation that is considered low in the art, for example, a deviation of 5% or less. In addition, when a certain parameter is referred to as being uniform in a given region, it may mean that it is uniform in terms of an average.

Throughout the specification, unless otherwise stated, each element may be singular or plural.

Arranging an arbitrary element "above (or below)" or "on (under)" another element may mean that the arbitrary element may be disposed in contact with the upper (or lower) surface of the element, and another element may also be interposed between the element and the arbitrary element disposed on (or under) the element.

In addition, it will be understood that when a component is referred to as being "linked," "coupled," or "connected" to another component, the elements may be directly "coupled," "linked" or "connected" to each other, or another component may be "interposed" between the components".

Throughout the specification, when "A and/or B" is stated, it means A, B or A and B, unless otherwise stated. That is, "and/or" includes any or all combinations of a plurality of items enumerated. When "C to D" is stated, it means C or more and D or less, unless otherwise specified.

FIG. 1 is a diagram illustrating a process of charging and discharging a battery depending on a driving situation of a vehicle.

A first example 110 illustrates a case where the battery is discharged or the battery is recharged by regenerative braking when the vehicle is traveling on a level ground. For example, when the driver presses the accelerator pedal of the vehicle, the vehicle may accelerate, and the battery may be discharged. In this case, the vehicle receives power from the battery to run the motor in the forward direction. Additionally, when the driver releases pressure on the accelerator pedal while driving (e.g., in a coasting state), the vehicle may continue to travel forward for a certain period of time due to inertia. In this case, the motor may run in the forward direction due to an external force, and the battery may be charged by the regenerative braking.

A second example 120 illustrates a case where a battery overcharging occurs when the vehicle is traveling from a higher altitude (e.g., a higher place) to a lower altitude (e.g., a lower place). For example, during descent driving from the higher altitude to the lower altitude such as downhill driving (hereinafter, also referred to as "altitude descent driving"), the vehicle may continue to travel forward even when the driver does not press the accelerator pedal (e.g., in a coasting state). In this case, an external force such as gravity may sustain forward rotation of the motor. As a result, the battery integrated into the vehicle may enter a state of overcharge due to the regenerative braking.

In a case where the battery overcharging persists due to the regenerative braking, a battery protection mechanism may be operated, resulting in a situation where the vehicle (e.g., an electric vehicle) either cannot draw power from the battery, or the electric vehicle is not properly controlled. Hereinafter, a method for preventing or substantially preventing battery overcharging while ensuring proper battery charging by derating charging power of a battery generated by regenerative braking during altitude descent driving of a vehicle will be described in more detail, according to an embodiment of the present disclosure.

Figure 2:
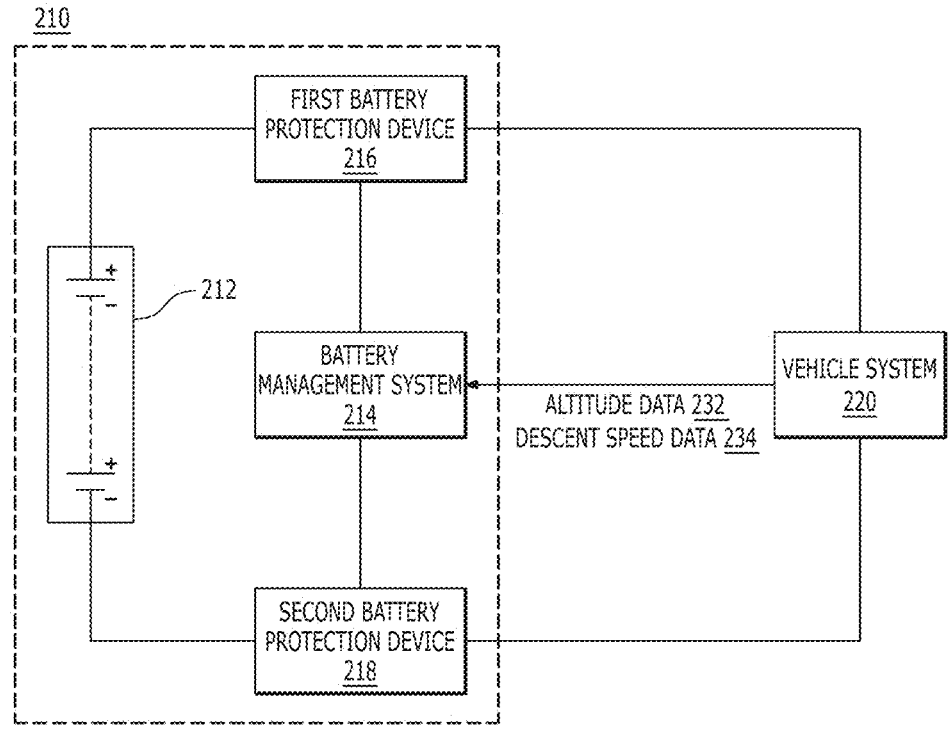
FIG. 2 is a block diagram of a battery pack connected to a vehicle system according to an embodiment of the present disclosure.

FIG. 2 is a block diagram of a battery pack 210 connected to a vehicle system 220 according to an embodiment of the present disclosure.

In an embodiment, the battery pack 210 may include a battery 212, a battery management system 214, and battery protection devices 216 and 218. The battery pack 210 may be installed inside a vehicle, and connected to the vehicle system 220.

The battery 212 may be a battery assembly including a plurality of battery cells. The battery cells may be lithium battery cells, sodium battery cells, or the like. However, the present disclosure is not limited thereto, and the battery cells may include any suitable kind of cell capable of repeatedly supplying electrical power through charging and discharging processes.

The battery protection devices 216 and 218 may refer to devices that are connected to the battery 212 to prevent or substantially prevent problems that may occur in the vehicle system by interrupting the battery connection in a hazardous situation, such as an overcurrent, a short circuit, and the like. For example, the battery protection devices 216 and 218 may be, but are not limited to, contactors.

The battery protection devices 216 and 218 may include a first battery protection device 216 and a second battery protection device 218. For example, as shown in FIG. 2, the first battery protection device 216 may be connected to a positive electrode of the battery 212. Through the first battery protection device 216, the power used for the vehicle system 220 may be supplied from the battery 212. The second battery protection device 218 may be connected to a negative electrode of the battery 212. Through the second battery protection device 218, the kinetic energy generated by the motor of the vehicle system 220 during regenerative braking may be converted to electrical energy to provide charging power to the battery 212.

The battery management system 214 may be connected with the battery 212, and may monitor status information of the battery 212 to control the charging and discharging of the battery 212. For example, the battery management system 214 may monitor status information of the battery cells constituting the battery assembly, such as a voltage, a current, a temperature, and the like, and may detect an overvoltage condition or an undervoltage condition of the battery cells.

Further, the battery management system 214 may be connected to the vehicle system 220, and may receive driving data of the vehicle. For example, the battery management system 214 may receive altitude data 232 from the vehicle system 220. Further, the battery management system 214 may receive descent speed data 234 from the vehicle system 220. The descent speed data 234 indicates a speed at which the vehicle descends from a higher altitude to a lower altitude.

The battery management system 214 may derate (e.g., limit) the charging power of the battery 212 based on the data received from the vehicle system 220. In more detail, the battery management system 214 may calculate a prediction value of the increase in a charging current of the battery 212 due to regenerative braking based on the altitude data 232 and the descent speed data 234. Then, the battery management system 214 may calculate a cumulative energy of the battery protection devices 216 and 218 using the calculated prediction value of the increase in the charging current and characteristic constants of the battery protection devices 216 and 218 connected to the battery. Thereafter, if (e.g., when) the calculated cumulative energy of the battery protection devices 216 and 218 falls within a range or a predetermined range (e.g., a percentage range) of the protection limit energy of the battery protection devices 216 and 218, the battery management system 214 may derate the charging power of the battery 212 by a proportion (e.g., a percentage) corresponding to the range (e.g., the predetermined range).

Accordingly, effectively derating of the charging power of the battery generated by regenerative braking during altitude descent driving of a vehicle equipped with the battery may be provided, thereby preventing or substantially preventing battery overcharging, and promoting safe vehicle operation.

Figure 3:
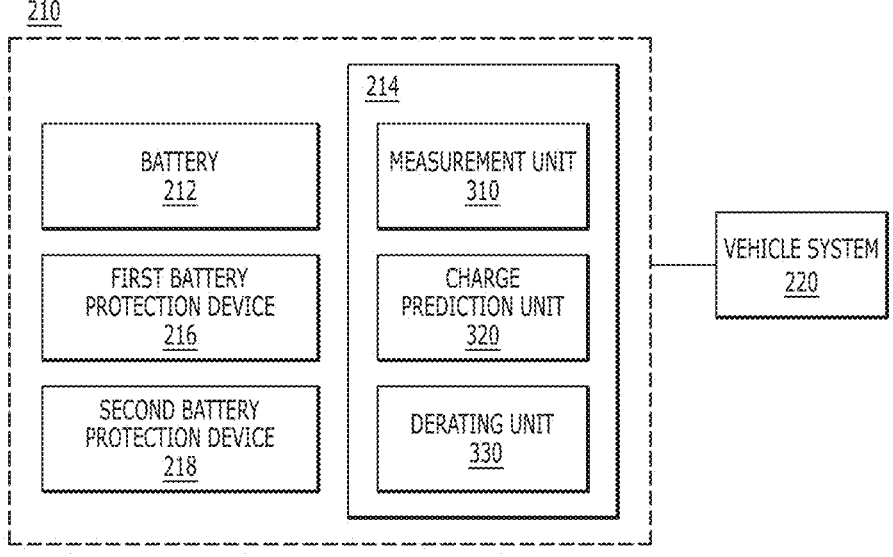
FIG. 3 is a detailed block diagram of the battery management system installed in the battery pack according to an embodiment of the present disclosure.

FIG. 3 is a detailed block diagram of the battery management system 214 installed in the battery pack 210 according to an embodiment of the present disclosure.

In an embodiment, the battery pack 210 may include a battery 212, first and second battery protection devices 216 and 218 connected to the battery 212, and the battery management system 214. The battery 212 may represent a battery assembly including a plurality of battery cells. Each of the battery protection devices 216 and 218 may be, but is not limited to, a contactor. The battery pack 210 may be installed inside a vehicle and connected to the vehicle system 220.

The battery management system 214 may be connected to the vehicle system 220, may receive driving data of the vehicle, and may derate the charging power of the battery 212 based on the driving data. In an embodiment, the battery management system (e.g., at least one processor of the battery management system) 214 may include a measurement unit 310, a charge prediction unit 320, and a derating unit 330. The internal configuration of the battery management system 214 shown in FIG. 3 is illustrated as an example, and in some embodiments, other components in addition to the components of the internal configuration shown in FIG. 3 may be further included, and some components may be omitted as needed or desired. While the components of the internal configuration of the processor of the battery management system 214 in FIG. 3 are illustrated separately from each other, it is not intended that the components are physically distinct from each other.

The measurement unit 310 may measure altitude data of the vehicle. In an embodiment, the measurement unit 310 may receive altitude data obtained by a position sensor and/or a positioning system installed in the vehicle system 220. For example, the altitude data may be altitude data obtained from a global positioning system (GPS) of the vehicle system 220. Additionally or as another example, the battery pack 210 may include a position sensor (e.g., an altitude sensor) capable of measuring altitude. In this case, the measurement unit 310 may measure the altitude of the vehicle from the position sensor embedded in the battery pack 210.

In an embodiment, the altitude data 232 may be cumulative altitude data for the vehicle, indicating an altitude at which the vehicle is located relative to a reference altitude.

In an embodiment, the altitude data 232 may indicate altitude change data of the vehicle. The measurement unit 310 may determine a cumulative altitude of the vehicle based on the altitude change data of the vehicle for each segment. For example, the measurement unit 310 may accumulate the altitude change data of the vehicle for each segment to determine a current altitude of the vehicle.

The measurement unit 310 may also receive speed data of the vehicle from the vehicle system 220. In an embodiment, the measurement unit 310 may receive speed data (e.g., the descent speed data) from the vehicle system 220 for a segment identified as the altitude descent driving. In another embodiment, the measurement unit 310 may determine the descent speed data based on speed data received periodically from the vehicle system 220. For example, the measurement unit 310 may determine the altitude descent driving of the vehicle based on the altitude data. If it is determined, by the measurement unit 310, that the vehicle descends from a higher altitude to a lower altitude, such as during downhill driving, the measurement unit 310 may determine the received speed data as the descent speed data.

In an embodiment, the descent speed data may be speed data at the time the data is received. In another embodiment, the descent speed data may be average speed data of segments of the vehicle's travel during the time interval of receiving the data.

The charge prediction unit 320 may calculate a prediction value of the increase in the charging current of the battery 212 due to regenerative braking based on the altitude data and the descent speed data. For example, the prediction value of the increase in the charging current of the battery 212 due to regenerative braking may be calculated according to Equation 1.

$$\frac{\text{cumulative altitude (m)}}{\text{descent distance for segment (m)}} \times \qquad \text{Equation 1}$$

$$\text{regenerative braking current} (A) =$$

$$\text{prediction value for increase in charging current} (A).$$

In Equation 1, the cumulative altitude may be cumulative altitude data of the vehicle determined based on the altitude data (e.g., the altitude data 232 of FIG. 2), which may indicate an altitude at which the vehicle is located relative to a reference altitude. Further, the descent distance for segment may be calculated by multiplying the descent speed data (e.g., the descent speed data 234 of FIG. 2) by the time interval of the corresponding segment. The regenerative braking current may have a value (e.g., a predetermined value). For example, the regenerative braking current in Equation 1 may be within a range of 250 A to 400 A to predict the increase in the charging current due to regenerative braking, but the present disclosure is not limited to the aforementioned numerical range.

Referring to Equation 1, the prediction value of the increase in charging current of the battery 212 due to regenerative braking is inversely proportional to the descent distance for segment or the descent speed data. For example, as the descent speed increases, the prediction value of the increase in the charging current may also increase, whereas as the descent speed decreases, the prediction value of the increase in the charging current may decrease. In other words, the charging current from regenerative braking is reduced if the driver applies the brakes during the altitude descent driving, such as during downhill driving, causing the vehicle to slow down. On the other hand, the charging current from regenerative braking is increased if the vehicle is propelled forward by gravity during the altitude descent driving, such as downhill driving.

The charge prediction unit 320 may calculate a cumulative energy of the battery protection devices 216 and 218 using the prediction value of the increase in the charging current and the characteristic constants of the battery protection devices 216 and 218 connected to the battery 212. Examples of utilizing the characteristic constants of the battery protection devices (e.g., the contactors and the like) to predict the value of the increase in the charging current due to regenerative braking have been described, but the present disclosure is not limited thereto. For example, a characteristic constant of a member (e.g., a busbar) capable of sensing a charging current flowing from the vehicle system to the battery may be utilized to predict the value of the increase in the charging current due to regenerative braking.

The charge prediction unit 320 may calculate the cumulative energy of the battery protection devices 216 and 218 based on the calculated prediction value of the increase in the charging current, the heating characteristic constant of the battery protection devices 216 and 218, the cooling characteristic constant of the battery protection devices 216 and 218, and the preceding cumulative energy. The calculated cumulative energy may be a subsequent cumulative energy calculated after a time interval (e.g., a predetermined time interval) from the obtaining of the preceding cumulative energy. For example, the cumulative energy of the battery protection devices 216 and 218 may be calculated at each time interval (e.g., at each predetermined time interval) according to Equation 2.

$$E_n = E_{n-1} \times \text{Cooling Factor} + I^3 \times \text{Heating Factor} \times t. \qquad \text{Equation 2}$$

In Equation 2, $E_n$ may represent the cumulative energy calculated in the current iteration (e.g., an n-th iteration). $E_{n-1}$ may represent the preceding cumulative energy calculated in the iteration prior to the time interval (e.g., the predetermined time interval), such as in the preceding iteration (e.g., (n−1)th iteration). The Cooling Factor in Equation 2 may be the cooling characteristic constant of the battery protection devices 216 and 218. For example, the Cooling Factor may be a characteristic constant for individual products of the battery protection devices 216 and 218. The Cooling Factor may be 0.999888, if the battery protection devices 216 and 218 are contactors. Further, the Heating Factor in Equation 2 may be the heating characteristic constant of the battery protection devices 216 and 218. For example, the Heating Factor may be a characteristic constant for individual products of the battery protection devices 216 and 218. The Heating Factor may be approximately 9.2e-11, if the battery protection devices 216 and 218 are contactors. Further, t in Equation 2 may be a sampling rate, which may indicate a time interval between the current iteration and the preceding iteration. Further, I in Equation 2 may be a prediction value of the increase in the charging current, which may represent a value calculated based on the altitude data and the descent speed data acquired in the current iteration described above with reference to Equation 1.

If the calculated cumulative energy falls within a range (e.g., a predetermined range) relative to the protection limit energy of the battery protection devices 216 and 218, the derating unit 330 may derate (e.g., limit) the charging power of the battery by a proportion corresponding to the range (e.g., the predetermined range). For example, in a case where the battery protection devices 216 and 218 are contactors, the protection limit energy may be about 26 Wh. For example, if the calculated cumulative energy falls in a range (e.g., a predetermined range) of 80% to 90% of the protection limit energy of the battery protection devices 216 and 218 (e.g., in a range from 20.8 Wh to 23.4 Wh), the derating unit 330 may derate the charging power by a proportion (e.g., about 25%) corresponding to the range (e.g., the predetermined range). A value of the protection limit energy of the battery protection devices is not limited to the foregoing example, and may be variously modified as needed or desired depending on individual products.

In an embodiment, the derating unit 330 may derate the charging power by controlling the amount of the charging current flowing from the vehicle system 220 to the battery 212 during regenerative braking. For example, the charging current from regenerative braking may be drawn from the vehicle system 220 to the battery 212 via an inverter. In this case, the derating unit 330 may control the inverter to control the amount of charging current to derate the charging power. The method of derating the charging power of the battery 212 is not limited to the foregoing examples, and various suitable methods may be applied as would be understood by those having ordinary skill in the art.

In an embodiment, a plurality of ranges (e.g., a plurality of predetermined ranges) that different from one another are provided for the protection limit energy of the battery protection devices, and the plurality of ranges may respectively correspond to different proportions for derating the charging power of the battery. Some examples of the proportion for derating the charging power corresponding to each of the plurality of ranges (e.g., each of the plurality of predetermined ranges) will be described in more detail below with reference to FIG. 6.

Figure 4:
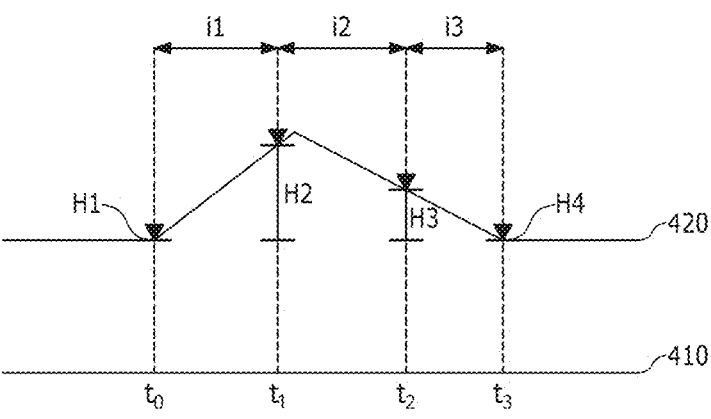
FIG. 4 is a diagram illustrating a method for derating a charging power of a battery based on a driving altitude of a vehicle according to an embodiment of the present disclosure.

FIG. 4 is a diagram illustrating a method for derating a charging power of a battery based on a driving altitude of a vehicle according to an embodiment of the present disclosure.

In an embodiment, the battery management system (e.g., battery management system 214) may obtain altitude data and speed data of the vehicle at time intervals (e.g., predetermined time intervals). For example, referring to timeline 410 in FIG. 4, the battery management system may obtain altitude data and speed data of the vehicle at first to fourth time points $t_0$, $t_1$, $t_2$, and $t_3$. In this case, the time interval between the first and second time points ($t_0$ and $t_1$), the time interval between the second and third time points ($t_1$ and $t_2$), and the time interval between the third and fourth time points ($t_2$ and $t_3$) may be the same or substantially the same as each other. Further, referring to the altitude line 420 in FIG. 4, the altitude of the vehicle at the first time point $t_0$ may be H1, the altitude of the vehicle at the second time point $t_1$ may be H2, the altitude of the vehicle at the third time point $t_2$ may be H3, and the altitude of the vehicle at the fourth time point $t_3$ may be H4.

In an embodiment, the battery management system may calculate a prediction value of the increase in the charging current of the battery due to regenerative braking based on the altitude data and the speed data of the vehicle obtained at the time intervals (e.g., the predetermined time intervals). The calculated prediction value may be used to derate the charging power of the battery.

A first segment i1 may be an entry into an elevation from a level ground. In the first segment i1, the vehicle altitude H2 measured at the second time point $t_1$ is higher than the vehicle altitude H1 measured at the first time point to. Thus, the battery management system may determine that the vehicle's altitude has increased in the first segment i1. In this case, the battery equipped in the vehicle (e.g., the battery 212 in FIG. 2) is discharging due to vehicle acceleration, and therefore, a prediction value of the increase in the charging current of the battery at the second time point $t_1$ may not be calculated. Therefore, the battery management system may not limit (e.g., derate) the charging power of the battery, because the battery is not being charged by the regenerative braking.

A second segment i2 may be an entry into a descent. In the second segment i2, the vehicle altitude H3 measured at the third time point $t_2$ is lower than the vehicle altitude H2 measured at the second time point $t_1$. Thus, the battery management system may determine that the vehicle's altitude has decreased in the second segment i2. In this case, the battery equipped in the vehicle may be charged by the regenerative braking. Therefore, a prediction value of the increase in the charging current of the battery may be calculated based on the descent speed data in the second segment i2. The battery management system may determine whether or not to derate the charging power of the battery due to regenerative braking by calculating a cumulative energy of the battery protection device based on the prediction value of the increase in the charging current calculated for the second segment i2, and determining whether or not the cumulative energy calculated for the second segment i2 falls within a protection threshold range.

A third segment i3 may be a continuation of the descent from the second segment i2. In the third segment i3, the vehicle altitude H4 measured at the fourth time point $t_3$ is lower than the vehicle altitude H3 measured at the third time point $t_2$. Thus, the battery management system may determine that the vehicle's altitude continues to decrease in the third segment i3. In this case, the battery equipped in the vehicle may be charged by the regenerative braking. Therefore, a prediction value of the increase in the charging current of the battery may be calculated based on the descent speed data in the third segment i3. The battery management system may calculate a cumulative energy of the battery protection device based on the prediction value of the increase in the charging current calculated for the third segment i3, and determine whether or not the cumulative energy calculated for the third segment i3 falls within a protection threshold range. If the cumulative energy calculated for the third segment i3 falls within the protection threshold range, the charging power of the battery may be derated by a proportion for derating the charging power corresponding to the protection threshold range.

For example, if the cumulative energy calculated for the second segment i2 is determined to be outside the protection threshold range, the charging power from regenerative braking may not be derated. On the other hand, if the cumulative energy calculated for the third segment i3 is determined to fall within the protection threshold range, the battery management system may derate the charging power from regenerative braking. In this case, the cumulative energy calculated for the third segment i3 takes into account the cumulative energy calculated for the second segment i2 that is the preceding cumulative energy. Therefore, the longer the descending segment continues, the more likely the charging power from regenerative braking may be derated to prevent or substantially prevent the battery from overcharging.

Figure 5:
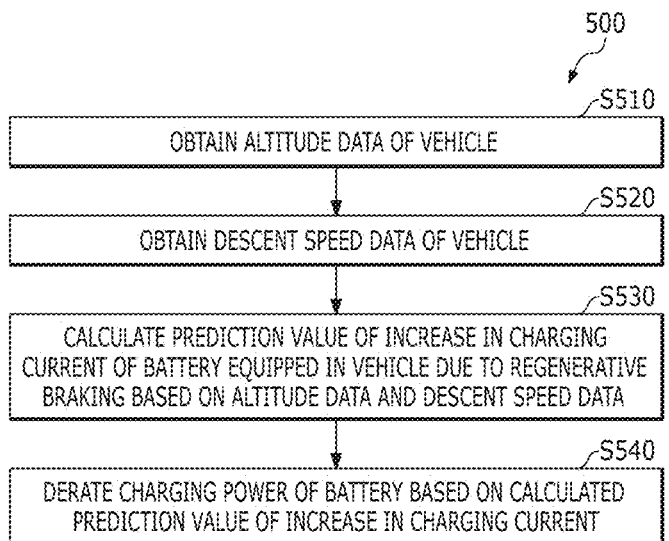
FIG. 5 is a flowchart of a method for derating a battery charging power according to an embodiment of the present disclosure.

FIG. 5 is a flowchart of a method 500 for derating a battery charging power according to an embodiment of the present disclosure.

The method 500 may be initiated by obtaining altitude data of a vehicle by at least one processor of the battery management system (e.g., the battery management system 214 in FIG. 2) (S510). In an embodiment, the processor may receive the altitude data periodically. In another embodiment, the altitude data may be obtained non-periodically. For example, the processor may receive the altitude data of the vehicle from a positioning system included in the vehicle. In another example, the processor may receive the altitude data of the vehicle from an altitude sensor embedded in the battery.

The processor may obtain descent speed data of the vehicle (S520). For example, the processor may receive speed data from the vehicle system for a segment identified as the altitude descent driving. In another example, the processor may receive speed data periodically from the vehicle system. In this case, the processor may determine the altitude descent driving of the vehicle based on the altitude data. If the processor determines that the vehicle descends from a higher altitude to a lower altitude, such as during downhill driving, the processor may then determine that the received speed data is the descent speed data.

The processor may calculate a prediction value of the increase in the charging current of the battery equipped in the vehicle due to the regenerative braking based on the altitude data and the descent speed data (S530). The prediction value of the increase in the charging current may be inversely proportional to the value of the descent speed data. For example, the prediction value of the increase in the charging current for a particular segment may be calculated by multiplying the regenerative braking current value by a descent driving distance for the particular segment with respect to the altitude data. Here, the descent driving distance in the particular segment may be calculated by multiplying the descent speed data in the particular segment by a driving time duration. The driving time duration may represent an acquisition frequency for the altitude data and the descent speed data.

The processor may derate the charging power of the battery based on the calculated prediction value of the increase in the charging current (S540). In more detail, the processor may calculate a cumulative energy of the battery protection device using the prediction value of the increase in the charging current and a characteristic constant of a battery protection device connected to the battery. The battery protection device may be, but is not limited to, a contactor. For example, the processor may calculate the cumulative energy of the battery protection device based on a prediction value of the increase in the charging current, a heating characteristic constant of the battery protection device, a cooling characteristic constant of the battery protection device, and a preceding cumulative energy. Here, the calculated cumulative energy may be a subsequent cumulative energy calculated after a time interval (e.g., a predetermined time interval) from the obtaining of the preceding cumulative energy.

Thereafter, the processor may derate the charging power of the battery based on the calculated cumulative energy of the battery protection device. For example, if the calculated cumulative energy of the battery protection device falls within a range or predetermined range (e.g., a percentage range) of the protection limit energy of the battery protection device, the processor may derate the charging power of the battery by a proportion (e.g., a percentage) corresponding to the range (e.g., the predetermined range).

In this case, the range relative to the protection limit energy of the battery protection device may include a plurality of different ranges of the protection limit energy of the battery protection device, and different proportions for derating the charging power of the battery may be respectively determined for the plurality of different ranges. Some examples of the proportions for derating the charging power of the battery respectively corresponding the plurality of different ranges will be described in more detail below with reference to FIG. 6.

Figure 6:
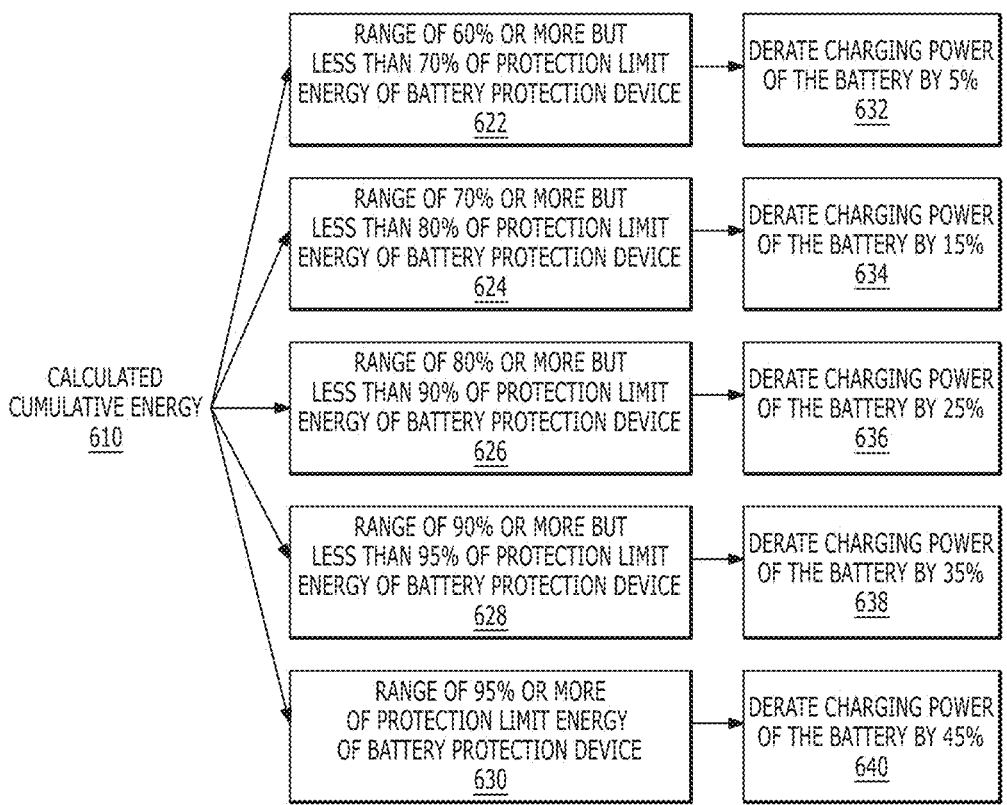
FIG. 6 is a diagram illustrating an example of a proportion (e.g., a percentage) for a charging power derating corresponding to a range (e.g., a percentage range) of a protection limit energy of a battery protection device according to an embodiment of the present disclosure.

FIG. 6 is a diagram illustrating an example of a proportion (e.g., a percentage) for a charging power derating corresponding to a range (e.g., a percentage range) of a protection limit energy of a battery protection device according to an embodiment of the present disclosure.

At least one processor of the battery management system (e.g., the battery management system 214 shown in FIG. 2) may derate the charging power of the battery by a proportion (e.g., a percentage) corresponding to a range or predetermined range (e.g., a percentage range) of a protection limit energy of a battery protection device described above with reference to FIG. 2, if (e.g., when) a cumulative energy 610 of the battery protection device falls within the range (e.g., the predetermined range).

In an embodiment, in a case where the calculated cumulative energy falls within a range of 60% or more but less than 70% of the protection limit energy of the battery protection device (622 of FIG. 6), the processor may derate the charging power of the battery through regenerative braking by 5% (632 of FIG. 6). In other words, the processor may control the charging power, such that 95% of the charging power available from regenerative braking in that range is supplied to the battery.

In another embodiment, in a case where the calculated cumulative energy falls within a range of 70% or more but less than 80% of the protection limit energy of the battery protection device (624 of FIG. 6), the processor may derate the charging power of the battery through regenerative braking by 15% (634 of FIG. 6). In other words, the processor may control the charging power, such that 85% of the charging power available from regenerative braking in that range is supplied to the battery.

In another embodiment, in a case where the calculated cumulative energy falls within a range of 80% or more but less than 90% of the protection limit energy of the battery protection device (626 of FIG. 6), the processor may derate the charging power of the battery through regenerative braking by 25% (636 of FIG. 6). In other words, the processor may control the charging power, such that 75% of the charging power available from regenerative braking in that range is supplied to the battery.

In another embodiment, in a case where the calculated cumulative energy falls within a range of 90% or more but less than 95% of the protection limit energy of the battery protection device (628 of FIG. 6), the processor may derate the charging power of the battery through regenerative braking by 35% (638 of FIG. 6). In other words, the processor may control the charging power, such that 65% of the charging power available from regenerative braking in that range is supplied to the battery.

In another embodiment, in a case where the calculated cumulative energy falls within a range of 95% or more of the protection limit energy of the battery protection device (630 of FIG. 6), the processor may derate the charging power of the battery through regenerative braking by 45% (640 of FIG. 6). In other words, the processor may control the charging power, such that 55% of the charging power available from regenerative braking in that range is supplied to the battery.

In the example described above with reference to FIG. 6, five ranges (e.g., predetermined ranges) are shown for a protection threshold range of the battery protection device (e.g., a proportion range of the protection limit energy of the battery protection device) associated with the derating of the battery charging power. However, the present disclosure is not limited thereto. Further, the protection threshold range of the battery protection device associated with the derating of the battery charging power and the proportion for derating the battery charge power corresponding to the protection threshold range are not limited to those described above with reference to the example of FIG. 6, and different threshold ranges and different proportions for derating the battery charge power corresponding to the different threshold ranges may be established.

This enables appropriately managing battery charging by predicting the value for the increase in the charging current during altitude descent driving of a vehicle equipped with the battery, and applying a different proportion for derating the charging power of the vehicle based on the predicted value for the increase in the charging current.

Figure 7:
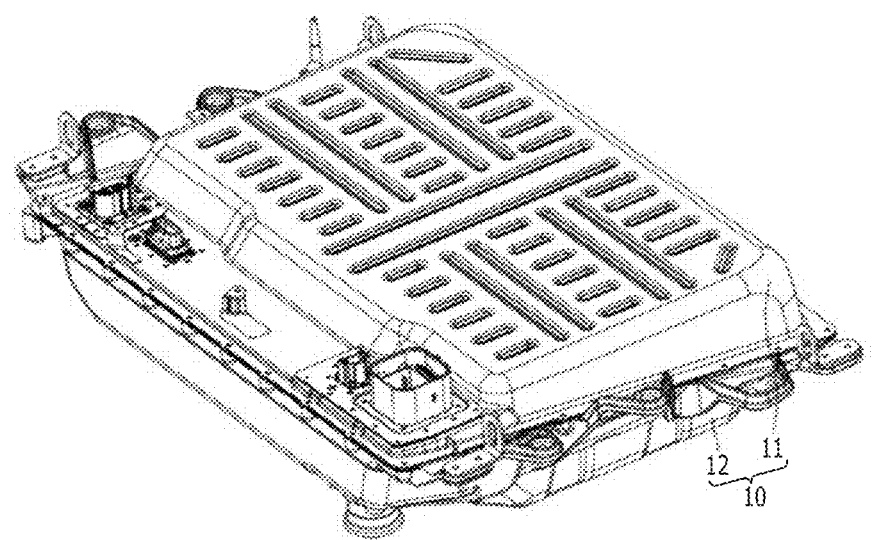
FIG. 7 illustrates a battery pack according to an embodiment of the present disclosure.
Figure 8:
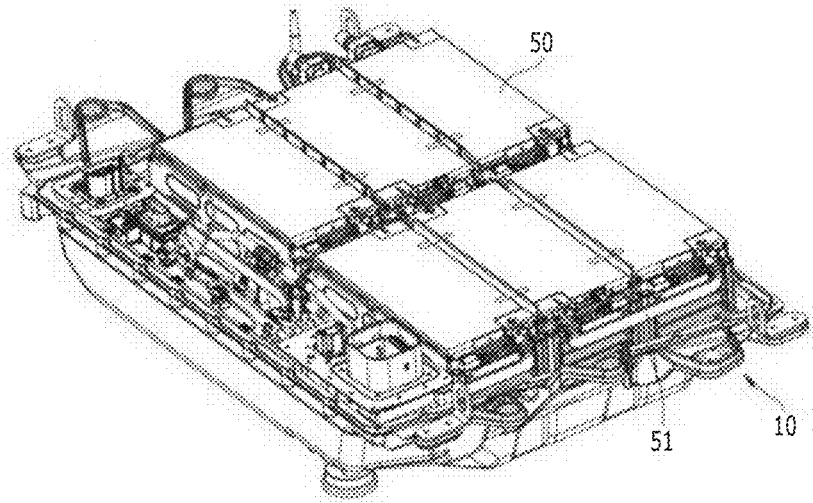
FIG. 8 illustrates a battery pack according to an embodiment of the present disclosure.

FIGS. 7 and 8 illustrate a battery pack according to one or more embodiments of the present disclosure.

The battery pack may include a plurality of battery modules 50 and a housing 10 for accommodating the plurality of battery modules 50. For example, the housing 10 may include first and second housings 11 and 12 coupled in opposite directions through the plurality of battery modules 50. The plurality of battery modules 50 may be electrically connected to each other by using a bus bar 51, and the plurality of battery modules 50 may be electrically connected to each other in a series/parallel or series-parallel mixed method, thereby obtaining desired (e.g., required) electrical output. Further, the battery pack may include a battery management system (e.g., battery management system 214 of FIG. 2) described above with reference to FIGS. 2 and 3 to obtain altitude accumulation data and speed data of the vehicle, and control the charging power of the battery by regenerative braking during the altitude descent driving of the vehicle based on the altitude accumulation data and the speed data.

Figure 9:
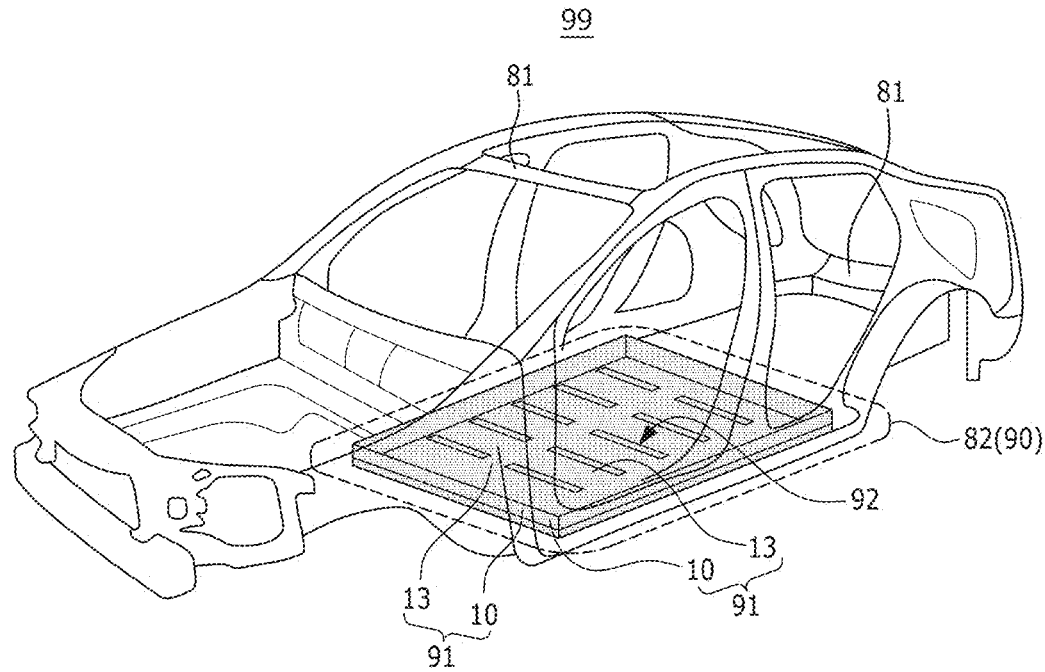
FIG. 9 illustrates a vehicle body and vehicle body parts including a battery pack according to an embodiment of the present disclosure.
Figure 10:
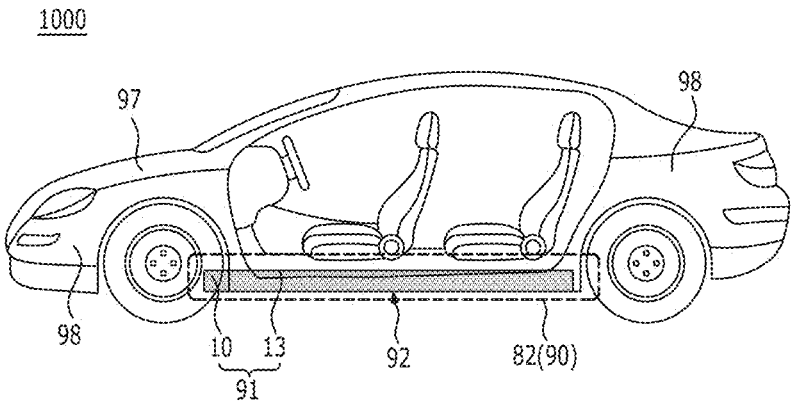
FIG. 10 illustrates a vehicle body and vehicle body parts including a battery pack according to an embodiment of the present disclosure.

FIGS. 9 and 10 illustrate a vehicle body and vehicle body parts including a battery pack according to one or more embodiments of the present disclosure.

In FIG. 9, a battery pack 91 may include a battery pack cover 13, which is a part of a vehicle underbody 92, and a pack frame 20 disposed under the vehicle underbody 92. The pack frame 20 and the battery pack cover 13 may be integrally formed with a vehicle floor 82. Here, the pack frame 20 may refer to a housing for accommodating the battery modules in the battery pack.

The vehicle underbody 92 separates the inside and outside of a vehicle, and the pack frame 20 may be disposed outside the vehicle.

FIG. 10 is a schematic side view of a vehicle according to one or more embodiments of the present disclosure.

A vehicle 1000 may be formed by combining additional parts, such as a hood 97 in front of the vehicle and fenders 98 respectively located in the front and rear of the vehicle to a vehicle body 99.

The vehicle 1000 may further include a vehicle floor 82, which is one of the vehicle body parts 90 including the battery pack 91 including the pack frame 20 and the battery pack cover 13.

The electronic or electric devices and/or any other relevant devices or components according to embodiments of the present disclosure described herein (e.g., the battery management system, the measurement unit, the charge prediction unit, the derating unit, and the like) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Although the present disclosure has been described above with respect to embodiments thereof, the present disclosure is not limited thereto. Various modifications and variations can be made thereto by those skilled in the art within the spirit of the present disclosure and the equivalent scope of the appended claims.

DESCRIPTION OF SOME REFERENCE SYMBOLS

110: first example
120: second example
210: battery pack
220: vehicle system

What is claimed is:

1. A method for derating a charge power of a battery, the method comprising:
obtaining altitude data of a vehicle for a time segment;
obtaining descent speed data of the vehicle for the time segment;
calculating, based on the altitude data and the descent speed data, a prediction value of an increase in a charging current of the battery equipped in the vehicle due to regenerative braking by multiplying a regenerative braking current value by a descent driving distance for the time segment, the descent driving distance being calculated based on the descent speed data for the time segment and a driving time duration; and derating the charging power of the battery based on the calculated prediction value.

2. The method as claimed in claim 1, wherein the obtaining of the altitude data of the vehicle comprises receiving the altitude data of the vehicle from a positioning system installed in the vehicle.

3. The method as claimed in claim 1, wherein the obtaining of the altitude data of the vehicle comprises receiving the altitude data of the vehicle from an altitude sensor embedded in the battery.

4. The method as claimed in claim 1, wherein the prediction value of the increase in the charging current is inversely proportional to a value of the descent speed data.

5. The method as claimed in claim 1, wherein the derating of the charging power of the battery based on the calculated prediction value comprises:

calculating a cumulative energy of a battery protection device connected to the battery using the calculated prediction value and a characteristic constant of the battery protection device; and derating the charging power of the battery based on the calculated cumulative energy of the battery protection device.

6. The method as claimed in claim 5, wherein the calculating of the cumulative energy of the battery protection device comprises:

calculating the cumulative energy of the battery protection device based on the calculated prediction value, a heating characteristic constant of the battery protection device, a cooling characteristic constant of the battery protection device, and a preceding cumulative energy, and wherein the calculated cumulative energy is a subsequent cumulative energy calculated after a time interval from a calculation of the preceding cumulative energy.

7. The method as claimed in claim 5, wherein the derating of the charging power of the battery based on the calculated cumulative energy of the battery protection device comprises:

derating the charging power of the battery by a proportion corresponding to a range relative to a protection limit energy of the battery protection device, if the calculated cumulative energy of the battery protection device falls within the range.

8. The method as claimed in claim 7, wherein the range relative to the protection limit energy of the battery protection device includes a plurality of different ranges of the protection limit energy of the battery protection device, and different proportions for derating the charging power of the battery are respectively determined for the plurality of different ranges.

9. The method as claimed in claim 7, wherein the derating of the charging power of the battery by the proportion corresponding to the range comprises, derating the charging power of the battery by 5%, if the calculated cumulative energy falls within a range of 60% or more but less than 70% of the protection limit energy of the battery protection device.

10. The method as claimed in claim 7, wherein the derating of the charging power of the battery by the proportion corresponding to the range comprises, derating the charging power of the battery by 15%, if the calculated cumulative energy falls within a range of 70% or more but less than 80% of the protection limit energy of the battery protection device.

11. The method as claimed in claim 7, wherein the derating of the charging power of the battery by the proportion corresponding to the range comprises, derating the charging power of the battery by 25%, if the calculated cumulative energy falls within a range of 80% or more but less than 90% of the protection limit energy of the battery protection device.

12. The method as claimed in claim 7, wherein the derating of the charging power of the battery by the proportion corresponding to the range comprises, derating the charging power of the battery by 35%, if the calculated cumulative energy falls within a range of 90% or more but less than 95% of the protection limit energy of the battery protection device.

13. The method as claimed in claim 7, wherein the derating of the charging power of the battery by the proportion corresponding to the range comprises, derating the charging power of the battery by 45%, if the calculated cumulative energy falls within a range of 95% or more of the protection limit energy of the battery protection device.

14. The method as claimed in claim 5, wherein the battery protection device comprises a contactor.

15. A non-transitory computer-readable recording medium storing instructions that, when executed by one or more processors, cause the one or more processors to perform the method according to claim 1.

16. A battery pack comprising:

a battery assembly comprising a plurality of battery cells;

a battery protection device connected to the battery assembly; and a battery management system comprising:

a measurement unit configured to measure altitude data of a vehicle for a time segment and descent speed data of the vehicle for the time segment;

a charge prediction unit configured to calculate a prediction value of an increase in a charging current of the battery assembly due to regenerative braking based on the altitude data and the descent speed data by multiplying a regenerative braking current value by a descent driving distance for the time segment, the descent driving distance being calculated based on the descent speed data and a driving time duration; and a derating unit configured to derate a charging power of the battery assembly based on the calculated prediction value of the increase in the charging current.

17. The battery pack as claimed in claim 16, wherein the charge prediction unit is configured to calculate a cumulative energy of the battery protection device based on the calculated prediction value of the increase in the charging current, a heating characteristic constant of the battery protection device, a cooling characteristic constant of the battery protection device, and a preceding cumulative energy, and wherein the calculated cumulative energy is a subsequent cumulative energy calculated after a time interval from a calculation of the preceding cumulative energy.

18. The battery pack as claimed in claim 17, wherein the derating unit is configured to derate the charging power of the battery assembly by a proportion corresponding to a range relative to a protection limit energy of the battery protection device, if the calculated cumulative energy falls within the range.

19. The battery pack as claimed in claim 18, wherein the range relative to the protection limit energy of the battery protection device comprises a plurality of different ranges of the protection limit energy of the battery protection device, and different proportions for derating the charging power of the battery assembly are respectively determined for the plurality of different ranges.

20. The battery pack as claimed in claim 16, wherein the battery protection device comprises a contactor.

\*  \*  \*  \*  \*